United States Patent
Suzuki

(10) Patent No.: US 7,649,554 B2
(45) Date of Patent: *Jan. 19, 2010

(54) METHOD, IMAGING DEVICE AND CAMERA FOR PRODUCING COMPOSITE IMAGE FROM MERGED IMAGE SIGNALS

(75) Inventor: Nobuo Suzuki, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 663 days.

This patent is subject to a terminal disclaimer.

(21) Appl. No.: 10/890,255

(22) Filed: Jul. 14, 2004

(65) Prior Publication Data

US 2005/0041138 A1 Feb. 24, 2005

(30) Foreign Application Priority Data

Jul. 31, 2003 (JP) ............................. 2003-283964

(51) Int. Cl.
*H04N 5/225* (2006.01)
*H04N 5/262* (2006.01)

(52) U.S. Cl. ..................................... 348/239; 348/216.1

(58) Field of Classification Search ............... 348/216.1, 348/218.1, 222.1, 239, 254; 382/284
See application file for complete search history.

(56) References Cited

U.S. PATENT DOCUMENTS 5,264,944 A * 11/1993 Takemura ..................... 386/38

6,747,694 B1 * 6/2004 Nishikawa et al. ......... 348/229.1
7,088,390 B2 * 8/2006 Mori et al. .................. 348/254
7,453,496 B2 * 11/2008 Suzuki ...................... 348/221.1
2002/0145674 A1 * 10/2002 Nakamura .................. 348/296

FOREIGN PATENT DOCUMENTS

| JP | 59-210775 A | | 11/1984 |
| JP | 6-141229 A | | 5/1994 |
| JP | 2000125209 A | * | 4/2000 |
| JP | 2002-135787 | | 5/2002 |
| JP | 2002-135787 A | | 5/2002 |
| JP | 2002135787 A | * | 5/2002 |

* cited by examiner

*Primary Examiner*—Timothy J Henn
(74) *Attorney, Agent, or Firm*—Birch, Stewart, Kolasch & Birch, LLP

(57) ABSTRACT

An image composition method comprises: subjecting a first high-sensitivity image signal generated based on high-sensitivity image outputs from corresponding ones of a plurality of pixel positions in a solid-state imaging element that has imaged a subject, to a first nonlinear conversion, so as to prepare a second high-sensitivity image signal; subjecting a first low-sensitivity image signal generated based on low-sensitivity image outputs from corresponding ones of the plurality of pixel positions, to a second nonlinear conversion, so as to prepare a second low-sensitivity image signal; and subjecting the second high-sensitivity image signal and the second low-sensitivity image signal to weight adding at every common pixel position, over the entire range of an incident light exposure level exhibited by each incident light that entered to each of the plurality of pixel positions, so as to produce a composed image signal of the subject.

11 Claims, 7 Drawing Sheets

METHOD, IMAGING DEVICE AND CAMERA FOR PRODUCING COMPOSITE IMAGE FROM MERGED IMAGE SIGNALS

This Non-provisional application claims priority under 35 U.S.C. § 119(a) on Patent Application No(s). 2003-283964 filed in Japan on Jul. 31, 2003, the entire contents of which are hereby incorporated by reference.

BACKGROUND OF THE INVENTION

1. Field of the Invention

The present invention relates to an image composition method or the like for producing an image signal having a wide dynamic range by merging together a high-sensitivity image signal and a low-sensitivity image signal, which have been obtained by means of photographing a subject, and more particularly, to an image composition method, a solid-state imaging device, and a digital camera, which prevent a composite image from becoming unnatural in the vicinity of a saturation point of the high-sensitivity image signal.

2. Description of the Related Art

An image photographed by a solid-state imaging device using a solid-state imaging element typified by a CCD image sensor or a CMOS image sensor has a shortcoming of a narrow dynamic range. For this reason, a photographic scene involving a wide dynamic range; for instance, optical images such as an image of a person or an afternoon garden observed by way of window panes from a dark, indoor location, cannot be acquired well.

Therefore, as described in JP-A-6-141229, the related-art digital camera is equipped with a solid-state imaging element capable of controlling a period of accumulation of electric charges. An image signal obtained as a result of a subject having been exposed for a long period of time (hereinafter called a "long-exposure image signal") is read, and an image signal obtained by exposing the same subject for a short period of time (hereinafter called a "short-exposure image signal") is continuously read. These two image signals are subjected to merging operation, to thus produce an image of the subject having a wide dynamic range.

According to the related-art technique described in JP-A-59-210775, there is used a solid-state imaging element, wherein half of an array of pixels is formed as high-sensitivity pixels and a remaining half is formed as low-sensitivity pixels. An image signal obtained from the high-sensitivity pixels and an image signal obtained from the low-sensitivity pixels, both pixels having been obtained during the same exposure time, are merged together, thereby producing an image of the subject having a wide dynamic range.

A long-exposure image signal output from the solid-state imaging element or an image signal obtained from the high-sensitivity pixel is called a high-sensitivity image signal. Moreover, a short-exposure image signal or an image signal obtained from the low-sensitivity pixel is called a low-sensitivity image signal.

In a case where the high-sensitivity image signal and the low-sensitivity image signal are merged, if the image signals output from the solid-state imaging element are merged together, the number of bits required to perform merging operation is increased. As a result, the amount of look-up table data having a gamma characteristic is also increased, which in turn renders a signal processing circuit for performing signal processing larger in scale and makes the digital camera disadvantageous in terms of cost.

For theses reasons, as described in JP-A-2002-135787, the following method is suitable for practice. Namely, according to this method, the high-sensitivity image signal and the low-sensitivity image signal are subjected to gamma characteristic conversion (i.e., nonlinear processing) through use of different gamma characteristics. Subsequently, the thus-processed signals are added together, thereby merging the signals.

FIG. 9 is a view showing an example of this signal, wherein a horizontal axis represents an incident light exposure level, and a vertical axis represents a signal level. The high-sensitivity image signal H rises comparatively sharply from a nominal level of incident light exposure. Hence, a nominal change in the incident light exposure level is also reflected as an image signal. However, the high-sensitivity image signal has a drawback of saturation arising when the incident light exposure level has reached a predetermined value "t", thereby causing a loss in color of an image of a bright subject.

In contrast, the low-sensitivity image signal L does not cause a loss in color of the image of the subject even when the incident light exposure level is high. The low-sensitivity image signal L has a drawback of the black color of the image of the subject becoming solid if the incident light exposure level is low. A composite signal G into which the two image signals H, L are merged reflects a change in the incident light exposure level as a change in the image signal G, regardless of whether the incident light exposure level is high or low. For this reason, the chance of occurrence of a loss in white color or occurrence of solid black becomes low, thereby enabling acquisition of an image having a wide dynamic range.

SUMMARY OF THE INVENTION

A ratio of sensitivity between the high-sensitivity image signal H and the low-sensitivity image signal L is usually not a constant value over the entire image, for reasons of a shading characteristic or the like of the solid-state imaging element. A saturation point of the signal level is also changed by the white balance gain of the amplifier or the like. Accordingly, a deviation arises between the saturation point of the high-sensitivity image signal H and the start of the low-sensitivity image signal L.

When signal composition to which the related-art technique of JP-A-2002-135787 has been applied is performed at such a time, the composite signal G becomes deficient in smoothness at a junction between the high-sensitivity image signal H and the low-sensitivity image signal L, thereby causing a problem of an image becoming unnatural at this junction.

An optimum sensitivity ratio and a gamma characteristic change according to a photographing scene. For this reason, in order to address such a change in the sensitivity ratio or gamma characteristic, lookup table data having a plurality of gamma characteristics must be prepared in memory of the digital camera beforehand, thereby incurring a hike in costs of the digital camera.

Even when a plurality of gamma characteristics have been prepared beforehand, rewriting of signal composition table data to be performed by the digital camera when a certain photographing scene has been captured involves consumption of much time, thereby raising a problem of an increase in the risk of letting it get away a shutter chance of the next photographing scene.

The object of the invention is to realize an image composition method which yields a composition gamma characteristic of providing smoothness in a connection between a high-sensitivity image signal and a low-sensitivity image signal even when a sensitivity ratio has changed, to thus prevent an image from becoming unnatural. The invention also provides an image composition method, a solid-state imaging device, and a digital camera, which can cope with various photographing scenes by means of a comparatively simple processing circuit.

An image composition method of the invention is directed toward an image composition method comprising: subjecting a first high-sensitivity image signal generated based on high-sensitivity image outputs from corresponding ones of a plurality of pixel positions in a solid-state imaging element that has imaged a subject, to a first nonlinear conversion, so as to prepare a second high-sensitivity image signal; subjecting a first low-sensitivity image signal generated based on low-sensitivity image outputs from corresponding ones of the plurality of pixel positions, to a second nonlinear conversion, so as to prepare a second low-sensitivity image signal; and subjecting the second high-sensitivity image signal and the second low-sensitivity image signal to weight adding at every common pixel position, over the entire range of an incident light exposure level exhibited by each incident light that entered to each of the plurality of pixel positions, so as to produce a composed image signal of the subject.

By means of this configuration, functions which effect nonlinear conversion are smoothly connected together over the entire range of incident light level, thereby eliminating unnatural portions from a composite image. Further, the scale of the processing circuit for merging images becomes smaller.

An image composition method of the invention is directed toward the image composition method, wherein a high-sensitivity image output and a low-sensitivity image output are image outputs from a high-sensitivity pixel and a low-sensitivity pixel in a common pixel position, respectively.

An image composition method of the invention is directed toward the image composition method, wherein a high-sensitivity image output is an image output by a longer period of exposure, and a low-sensitivity image output is an image output by a shorter period of exposure, by using a common pixel.

An image composition method of the invention is directed toward the image composition method, wherein, provided that the second high-sensitivity image signal is taken as $G_H(S_H)$; the second low-sensitivity image signal is taken as $G_L(S_L)$; and the composed image signal is taken as Gc, the weight adding is performed according to a composing expression:

$$Gc = k \cdot G_H(S_H) + (1-k) \cdot G_L(S_L)$$

where k is a composite parameter having a value falling within a range of $0 \leq k \leq 1$.

By means of this configuration, an optimum resolution of a composite image can be determined by means of changing the value of the composite parameter "k", thereby facilitating adjustment of the resolution. Moreover, there is no necessity for preparing a plurality of nonlinear conversion data sets, thereby diminishing the capacity of memory. Moreover, the time required to rewrite a table becomes unnecessary, thereby preventing a shutter chance from being slipping away.

An image composition method of the invention is directed toward the image composition method, wherein, k is determined by a histogram shape of the first high-sensitivity image signal and a histogram shape of the first low-sensitivity image signal.

By means of this configuration, the value of the composite parameter "k" optimum for each photographing scene can be automatically determined.

An image composition method of the invention is directed toward the image composition method, wherein, k is determined by a sensitivity ratio of the first high-sensitivity image signal to the first low-sensitivity image signal at a predetermined exposure time.

By means of this configuration, a composite image appropriate for a sensitivity ratio can be generated. Even when variations have a risen in the sensitivity ratio, occurrence of an unnatural image in a composite image in the vicinity of saturation point of said high-sensitivity image signal is prevented.

An image composition method of the invention is directed toward the image composition method, wherein k is determined by: (a) a histogram shape of the first high-sensitivity image signal and a histogram shape of the first low-sensitivity image signal; and (b) a sensitivity ratio of the first high-sensitivity image signal to the first low-sensitivity image signal at a predetermined exposure time.

An image composition method of the invention is directed toward the image composition method, further comprising: replacing at least one of the first low-sensitivity image signal and the second low-sensitivity image signal with a third signal in a signal level range in which a linear value of the first high-sensitivity image signal is lower than a predetermined level, wherein the third signal is obtained by subjecting to weighting average a fourth signal and the first low-sensitivity image signal, the fourth signal being provided as [the first high-sensitivity image signal/a sensitivity ratio], wherein the sensitivity ratio=[the first high-sensitivity image signal to the first low-sensitivity image signal at a predetermined exposure time].

By means of this configuration, a signal-to-noise ratio of the low-sensitivity image signal used for merging images can be improved, thereby improving a signal-to-noise (S/N) ratio of the composite image.

An image composition method of the invention is directed toward the image composition method, wherein the first nonlinear conversion is a first gamma conversion which realizes a monotonously-increasing function and a monotonously-decreasing function, whose change in a differential value; i.e., a slope, is positive or zero at all times and monotonously decreasing; the second nonlinear conversion is a second gamma conversion which realizes a monotonously-increasing function and a monotonously-decreasing function, whose change in a differential value; i.e., a slope, is positive or zero at all times and monotonously decreasing; and a characteristic of the first gamma conversion differs from a characteristic of the second gamma conversion.

By means of this configuration, a composite image having superior picture quality can be generated.

A solid-state imaging device of the invention is directed toward a solid-state imaging device comprising: (1) a solid-state imaging element having a plurality of pixel positions, wherein the solid-state imaging element images a subject, and generates high-sensitivity image outputs from corresponding ones of the plurality of pixel positions and low-sensitivity image outputs from corresponding ones of the plurality of pixel positions; and (2) an image processing portion that (2-1) subjects a first high-sensitivity image signal generated based on the high-sensitivity image outputs, to a first nonlinear conversion, so as to prepare a second high-sensitivity image signal, (2-2) subjects a first low-sensitivity image signal generated based on the low-sensitivity image outputs, to a second nonlinear conversion, so as to prepare a second low-sensitivity image signal, (2-3) subjects the second high-sensitivity image signal and the second low-sensitivity image signal to weight adding at every common pixel position, over the entire range of an incident light exposure level exhibited by each incident light that entered to each of the plurality of pixel positions, so as to produce a composed image signal of the subject; and (2-4) output the composed image signal.

A solid-state imaging device of the invention is directed toward a solid-state imaging device comprising: means for subjecting a first high-sensitivity image signal generated based on high-sensitivity image outputs from corresponding ones of a plurality of pixel positions in a solid-state imaging element that has imaged a subject, to a first nonlinear conversion, so as to prepare a second high-sensitivity image signal; means for subjecting a first low-sensitivity image signal generated based on low-sensitivity image outputs from corresponding ones of the plurality of pixel positions, to a second nonlinear conversion, so as to prepare a second low-sensitivity image signal; and means for subjecting the second high-sensitivity image signal and the second low-sensitivity image signal to weight adding, over the entire range of an incident light exposure level exhibited by each incident light that entered to each of the plurality of pixels, so as to produce a composed image signal of the subject.

By means of this configuration, data pertaining to an image of a subject which is output from the solid-state imaging device and has a wide dynamic range is free from unnatural image portions, thereby enhancing quality of an output image.

A solid-state imaging device of the invention is directed toward the solid-state imaging device, wherein, provided that the second high-sensitivity image signal is taken as $G_H(S_H)$; the second low-sensitivity image signal is taken as $G_L(S_L)$; and the composed image signal is taken as Gc, the weight adding is performed according to a composing expression:

$$Gc = k \cdot G_H(S_H) + (1-k) \cdot G_L(S_L)$$

where k is a composite parameter having a value falling within a range of $0 \leq k \leq 1$.

By means of this configuration, the circuit scale of the solid-state imaging device can be made much smaller.

A digital camera of the invention is directed toward a digital camera comprising: the previously-described solid-state imaging device; and an optical system that forms an optical image of the subject on the solid-state imaging element.

By means of this configuration, an image of a subject having superior quality of a wide dynamic range can be photographed.

A digital camera of the invention is directed toward the digital camera, wherein, provided that the second high-sensitivity image signal is taken as $G_H(S_H)$; the second low-sensitivity image signal is taken as $G_L(S_L)$; and the composed image signal is taken as Gc, the weight adding is performed according to a composing expression:

$$Gc = k \cdot G_H(S_H) + (1-k) \cdot G_L(S_L)$$

where k is a composite parameter having a value falling within a range of $0 \leq k \leq 1$.

By means of this configuration, the circuit scale of the digital camera can be made smaller, thereby enabling photographing of a high-quality image of a subject at low cost.

DETAILED DESCRIPTION OF THE INVENTION

An embodiment of the invention will be described hereinbelow by reference to the drawings.

First Embodiment

Figure 1:
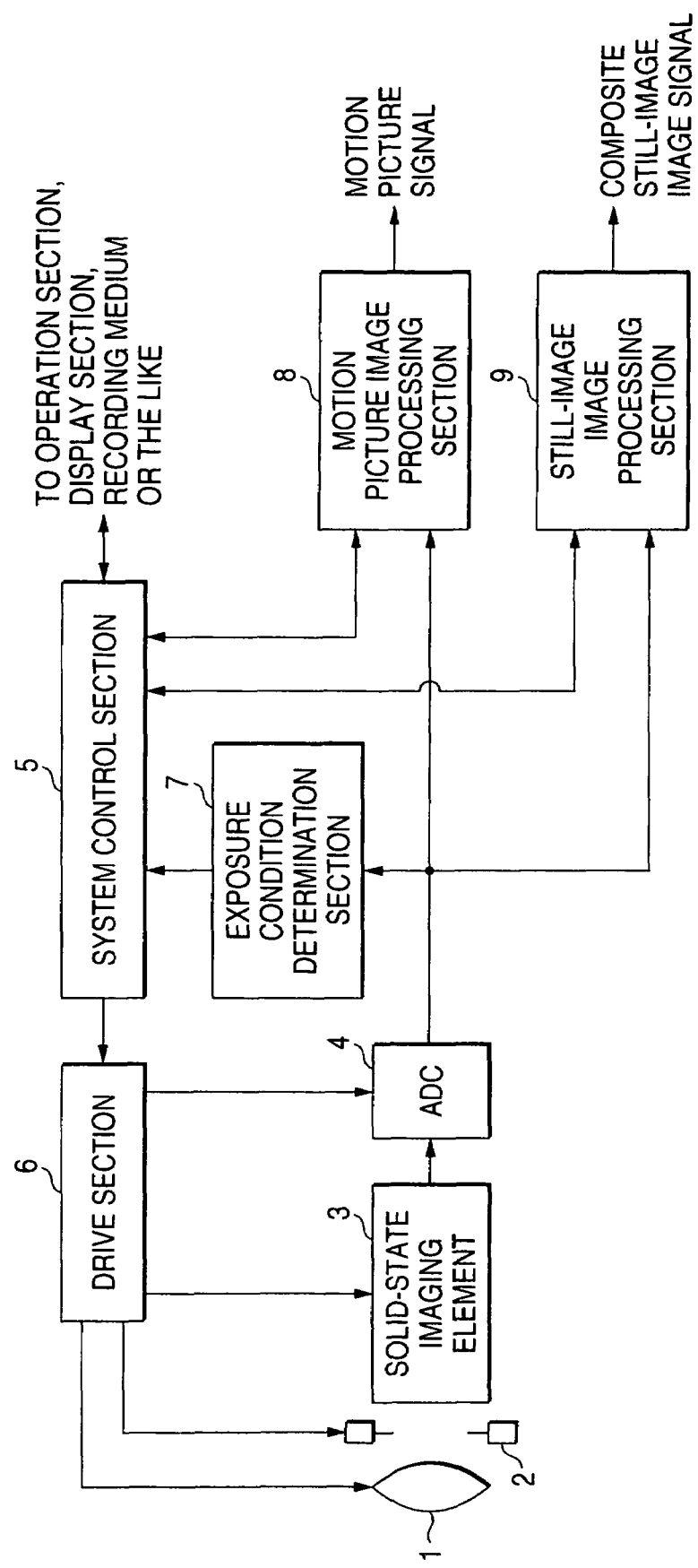
FIG. 1 is a block diagram of a digital camera according to a first embodiment of the present invention.

FIG. 1 is a block diagram of a digital camera according to a first embodiment of the invention. The digital camera is a digital still camera, but the present invention can also be applied to a digital camera of another type, such as a digital video camera.

In FIG. 1, the digital camera according to the embodiment comprises an optical system 1 such as a lens; a mechanical shutter 2 disposed behind the optical system 1; a solid-state imaging element 3, such as a CCD or CMOS, for converting, into an electrical signal, an optical image of a subject formed by the optical system 1; an analog-to-digital conversion circuit (ADC) 4 for converting an analog image pickup signal output from the solid-state imaging element 3 into a digital signal; a system control section 5 for controlling the entirety of the digital camera in a centralized manner; a drive section 6 for driving and controlling the optical system 1, the mechanical shutter 2, the solid state imaging element 3, and the ADC 4 in accordance with a command signal output from the system control section 5; and an exposure condition determination section 7 which acquires R (red), G (green), and B (blue) image signals output from the ADC 4, which calculates a parameter "k" to be described later and an optimum exposure condition, and which outputs the parameter and the optimum exposure condition to the system control section 5.

As described in the above-described JP-A-6-141229, the solid-state imaging element 3 may be of a type wherein pixels having the same sensitivity are arranged in an array, and a high-sensitivity image signal obtained through long exposure and a low-sensitivity image signal obtained through short exposure are output. Moreover, as described in the above-described JP-A-59-210775, the solid-state imaging element 3 may also be of another type, wherein high-sensitivity pixels and low-sensitivity pixels are arranged adjacently in an array, and a high-sensitivity image signal obtained from high-sensitivity pixels and a low-sensitivity image signal obtained from low-sensitivity pixels are output. The digital camera is described as being equipped with the solid-state imaging element 3 having the high-sensitivity pixels and the low-sensitivity-pixels formed therein.

The digital camera further comprises a motion-picture image processing section 8 and a still-image image processing section 9. The motion-picture image processing section 8 acquires an RGB image signal output from the ADC 4, performs processing in accordance with a command from the system control section 5, and outputs a motion-picture signal. This motion-picture signal is displayed as a through image on a color liquid-crystal display section or the like provided on the back of a camera or the like or is recorded in a recording medium.

The still-image image processing section 9 merges an RGB high-sensitivity image signal and an RGB low-sensitivity image signal, both being output from the ADC 4, in a manner to be described later, thereby generating and outputting subject image data having a wide dynamic range (WDR).

Figure 2:
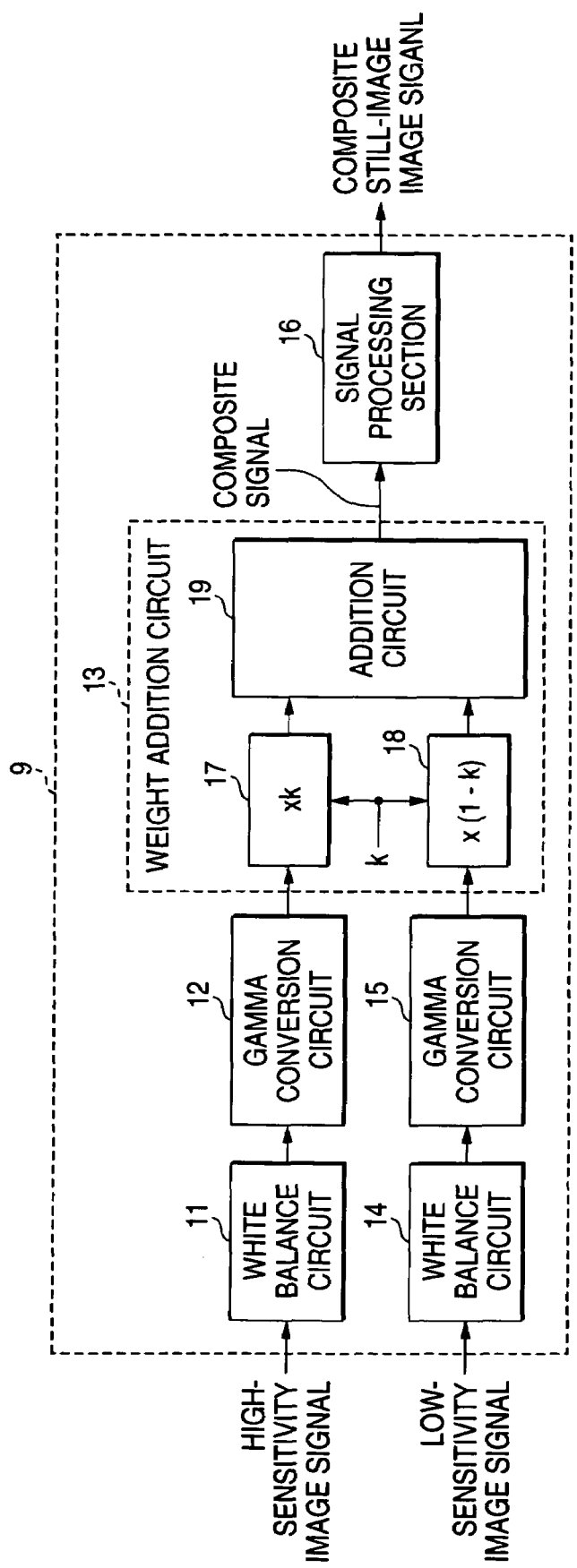
FIG. 2 is a detailed block diagram of a still-image (WDR) image processing section shown in FIG. 1.

FIG. 2 is a detailed block diagram of the image processing section 9 shown in FIG. 1. This still-image image processing section 9 comprises a white balance circuit 11 which captures a high-sensitivity image signal and subjects the signal to white balance correction; a gamma conversion circuit 12 which subjects the high-sensitivity image signal having undergone white balance correction to gamma conversion processing, which is nonlinear processing, and which outputs the gamma-converted high-sensitivity image signal to a weight addition circuit 13 on a subsequent stage; a white balance circuit 14 which captures a low-sensitivity image signal and subjects the image signal to white balance correction; a gamma conversion circuit 15 which subjects the low-sensitivity image signal having undergone white balance correction to gamma conversion and outputs the low-sensitivity image signal having undergone gamma conversion to the weight addition circuit 13 on the subsequent stage; and a signal processing section 16 for subjecting the composite signal having undergone weighting addition performed by the weight addition circuit 13 to known signal processing such as synchronization or RGB-YC conversion processing, to thus output a merged still image signal.

The weight addition circuit 13 has a multiplication circuit 17 for outputting a signal $[k \cdot G_H(S_H)]$ determined by multiplying a high-sensitivity image signal $G_H(S_H)$ captured from the gamma conversion circuit 12 by the value of the parameter "k"; a multiplication circuit 18 for outputting a signal $[(1-k) \cdot G_L(S_L)]$ determined by multiplying the low-sensitivity image signal $G_L(S_L)$ captured from the gamma conversion circuit 15 by a value (1−k) obtained as a result of subtraction of the parameter "k" from 1; and an addition circuit 19 which adds together the signals output from the multiplication circuits 17, 18 and outputs an addition signal $Gc[=k \cdot G_H(S_H)+(1-k) \cdot G_L(S_L)]$ as a composite signal to the signal processing section 16.

Operation of the digital camera having the foregoing configuration will now be described.

During a period in which an unillustrated power source of the digital camera remains activated and the digital camera remains in a photographing mode, an image signal is always read from the solid-state imaging element 3 at a predetermined cycle. The exposure condition determination section 7 captures an image signal output from the ADC 4 at all times, computes optimum exposure conditions and optimum values of composite parameter "k" at different times, and outputs the exposure condition and the parameter "k" to the system control section 5.

Specifically, the exposure condition determination section 7 captures the high-sensitivity image signal and the low-sensitivity image signal and determines an exposure time optimum for a photographing scene of interest and the value of the composite parameter "k" to be used for producing a composite gamma characteristic.

An optimum exposure time is determined in, e.g., the following manner. When a histogram of the high-sensitivity image signal obtained for the case of an optimum exposure time is plotted, two peaks appear. One peak appears in the vicinity of the center of the histogram, and the other peak appears at a position in excess of saturation power. Similarly, when a histogram of the low-sensitivity image signal obtained for the optimum exposure time is plotted, two peaks also appear. One peak appears in the vicinity of the center of the histogram, and the other peak appears in the vicinity of zero; that is, the region of the high-sensitivity image signal. An exposure time during which such peaks appear in the histogram is determined as an optimum exposure time.

The value of the composite parameter "k" is determined in the following manner. When the optimum exposure time has been determined, a sensitivity ratio R (i.e., a ratio of a high-sensitivity image signal to a low-sensitivity image signal obtained under an input of identical light) is eventually determined. The value of an optimum composite parameter "k" is determined from the sensitivity ratio R and the shape of the histogram. The parameter "k" assumes a value of $0 \leq k \leq 1$.

The system control section 5 outputs a control command to the drive section 6 such that the thus-obtained optimum exposure time is attained, thereby controlling operation pulses to the optical system 1, the mechanical shutter 2, and the solid-state imaging element 3.

Here, when the user has pressed an unillustrated shutter button of the digital camera, the electronic shutter is opened, and the mechanical shutter 2 is closed after lapse of a predetermined exposure time. A high-sensitivity image signal is first read from the high-sensitivity pixels of the solid-state imaging element 3, and the high-sensitivity image signal output from the ADC 4 is stored in unillustrated memory. Next, the low-sensitivity image signal is read from the low-sensitivity pixel, and the low-sensitivity image signal output from the ADC4 is stored in the unillustrated memory. The high-sensitivity image signal and the low-sensitivity image signal, which have been read from the memory on a per-pixel basis, are input to the still-image image processing section 9. The high-sensitivity image signal and the low-sensitivity image signal, which have been output from the same pixel position, are merged through use of the composite parameter "k".

Figure 3:
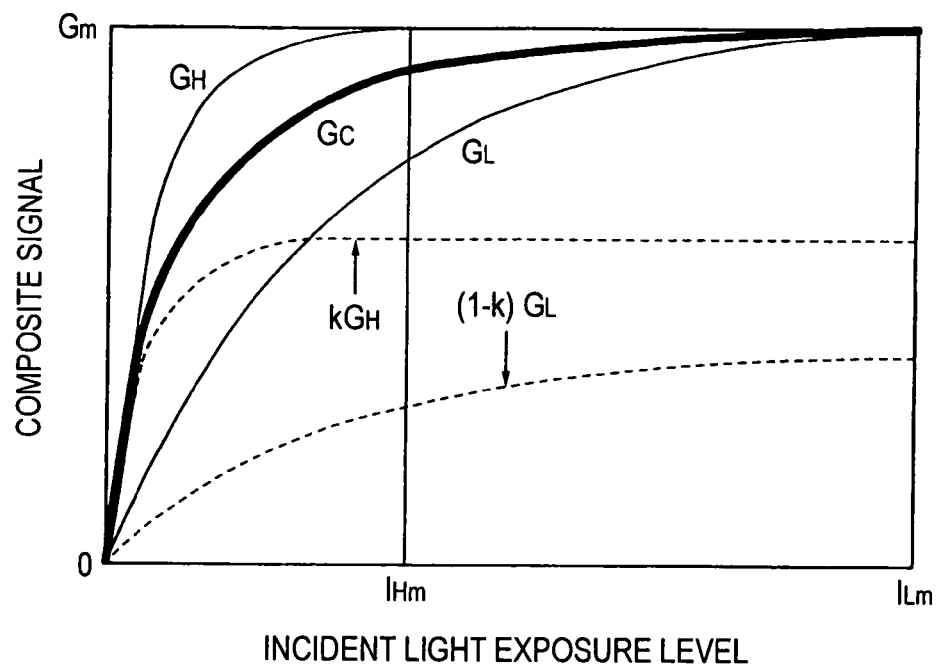
FIG. 3 is a descriptive view of the image composition of the first embodiment of the present invention.

FIG. 3 is a descriptive view of merging of signals according to the embodiment. A curve $G_H$ shown in FIG. 3 is a gamma characteristic of the high-sensitivity image signal and has the following characteristics. The high-sensitivity image signal (on the vertical axis) becomes constant at a level higher than a saturation level $I_{Hm}$ or more, and the high-sensitivity image signal (a gamma characteristic $G_H$) becomes constant at a saturation value Gm (usually a value of 255, with an accuracy of 8 bits). The slope of the gamma characteristic $G_H$ is always 0 or positive and decreases monotonously. The slope becomes smaller with an increase in the incident light exposure level, and the slope assumes a value of 0 in the vicinity of the saturation level $I_{Hm}$.

A change in slope is not great, and settings are made such that the slope changes smoothly (continuously). However, there may be a case where an S-shaped characteristic is imparted to the slope in order to prevent noise from becoming noticeable in the vicinity of 0. In such a case, the slope temporarily increases in the vicinity of 0.

A curve $G_L$ shown in FIG. 3 shows a gamma characteristic of the low-sensitivity image signal and has the following characteristics. When the incident light exposure level reaches the saturation level $I_{Lm}$, the low-sensitivity image signal (a gamma characteristic $G_L$) assumes the saturation value Gm. The slope of the gamma characteristic $G_L$ assumes a value of "0" or is positive at all times and decreases monotonously. The slope becomes smaller with an increase in the incident light exposure level.

In relation to the gamma characteristic $G_L$, the slope does not need to be set to "0" in the vicinity of the saturation level $I_{Lm}$, as in the case of the gamma characteristic $G_H$, but a value of 0 may be selected for the slope. A change in slope is not great, and settings are made such that the slope changes smoothly (continuously). The low-sensitivity image signal becomes constant at the saturation value Gm in excess of the saturation level $I_{Lm}$.

In the embodiment, a composite signal Gc is obtained from the high-sensitivity image signal and the low-sensitivity image signal by means of a merging expression [Gc=k·$G_H$($S_H$)+(1−k)·$G_L$($S_L$)]. FIG. 3 shows the high-sensitivity image signal $G_H$[($S_H$) is omitted from the drawing] multiplied by a factor of "k"; the low-sensitivity image signal $G_L$[($S_L$) is omitted from the drawing] multiplied by a factor of 1−k; and the composite signal Gc. Weighting addition of the high-sensitivity and low-sensitivity image signals is equivalent to weighting addition of the gamma characteristic corresponding to the high-sensitivity image signal and the gamma characteristic corresponding to the low-sensitivity image signal. The value of the composite parameter "k" corresponds to assignment of a gradation (bit) to the high-sensitivity image signal in the composite signal.

As the value of the composite parameter "k" approaches "1", the high-sensitivity image signal becomes dominant over the entire image. In contrast, when the value of the composite parameter "k" approaches "0", the low-sensitivity image signal becomes dominant over the entire image. An intermediate between these cases is attained in the case of k=½, wherein a balance is achieved between the high-sensitivity image signal and the low-sensitivity image signal over the entire image.

Figure 4:
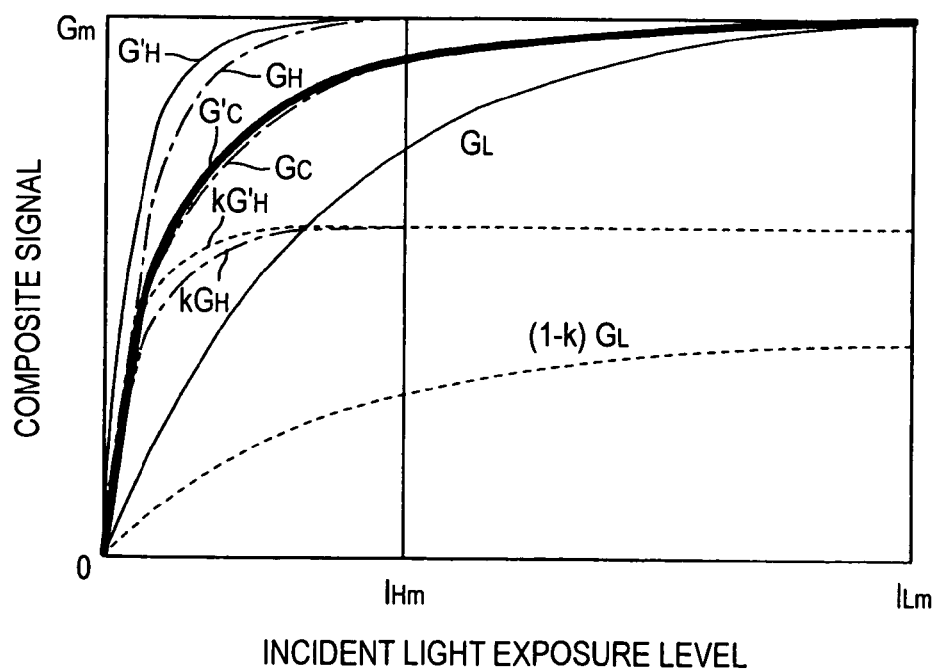
FIG. 4 is another descriptive view of the image composition of the first embodiment of the present invention.

FIG. 4 shows a view showing a high-sensitivity image signal (having a larger sensitivity ratio) which has fallen outside the setting conditions. The gamma characteristic corresponding to the high-sensitivity image signal changes from $G_H$ to $G'_H$. However, the slope of the gamma characteristics assumes a value of 0 in the vicinity of the saturation level $I_{Hm}$ of the high-sensitivity image signal. Hence, even when the sensitivity ratio has deviated from the setting to some extent, a merging characteristic G'c assumes a smooth junction, and an unnatural image attributable to discontinuity in the gamma characteristic does not appear.

Figure 5:
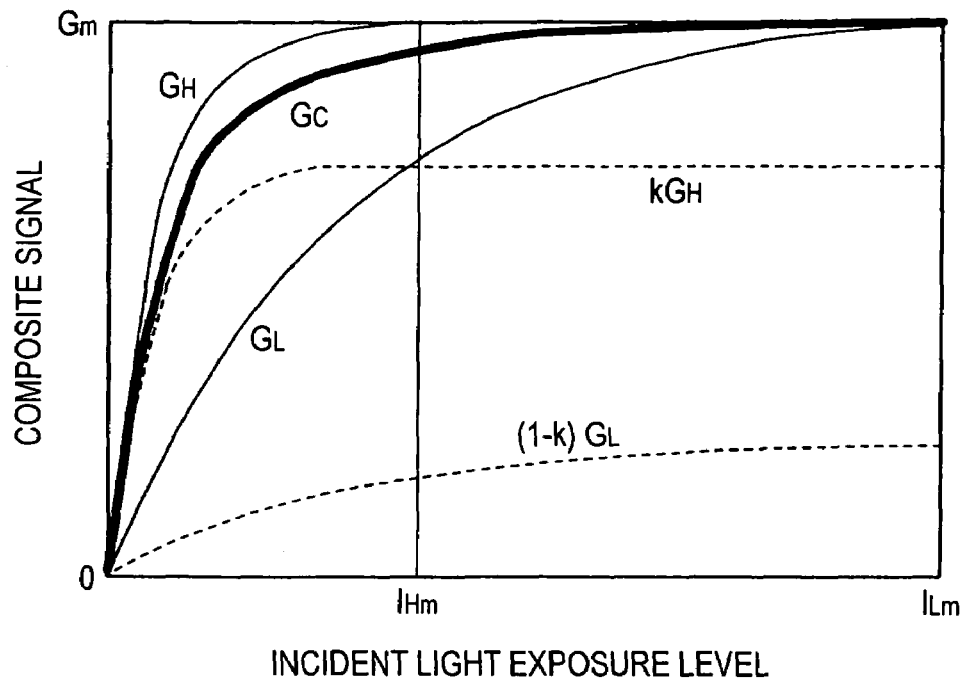
FIG. 5 is yet another descriptive view of the image composition of the first embodiment of the present invention.

FIG. 5 is a view showing an example (e.g., the color of sky or clouds), wherein the picture quality of surroundings is close to optimum and the resolution of only a bright portion of the subject is desired to be enhanced so as to prevent sky from losing blue color, which would otherwise be caused when sky is taken as a subject. In this case, the only requirement is to improve a bright portion slightly. Hence, for instance, the value of the composite parameter "k" is set to a value close to "1", such as k=0.75. Sufficient gradation is achieved around a low-level area, but little gradation is achieved in a high-level area. However, an image can be resolved, and hence an image having a wide, sufficient dynamic range can be obtained.

Figure 6:
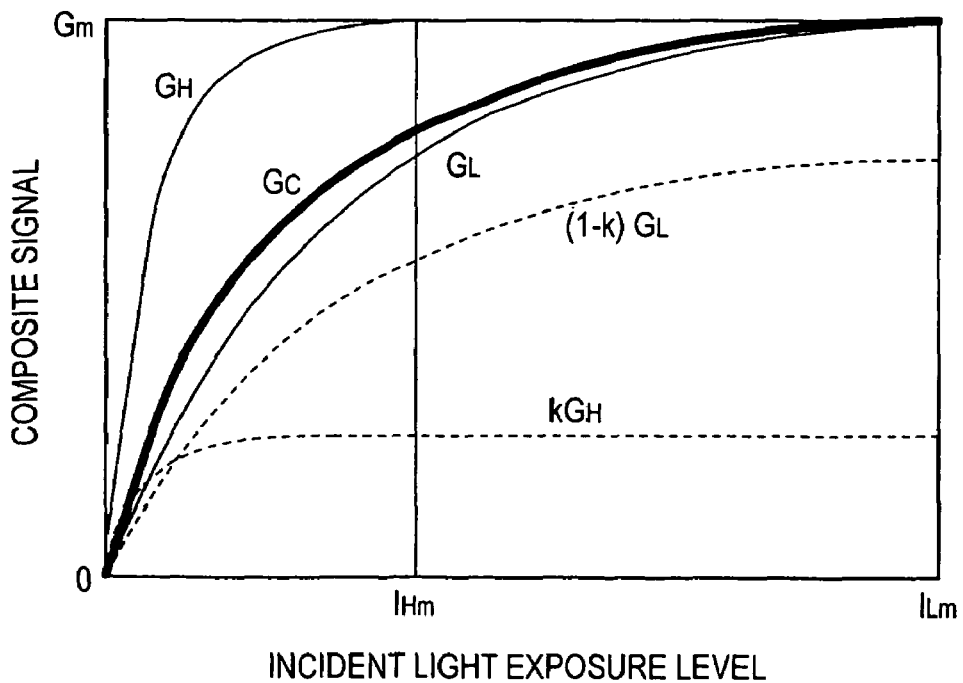
FIG. 6 is still another descriptive view of the image composition of the first embodiment of the present invention.

FIG. 6 is a view showing an example improvement in occurrence of solid black in a dark portion of the image of the subject. When occurrence of solid black is desired to be enhanced, a small value; e.g., k=0.25, should be selected. Overall picture quality is retained by gradation of the low-sensitivity image signal, and occurrence of solid black in only a black portion is prevented. If both a low-level area and a high-level area are desired to be fully resolved as in the case of, e.g., a backlighted person or a view observed through window panes, the parameter "k" should be set to k=0.5.

Setting the value of the composite parameter "k" to an optimum value in accordance with a photographing scene in the manner as mentioned above prevents mixing of an unnatural image into an image of a subject having a wide dynamic range. Further, merging of images is performed through use of the value of the composite parameter "k", and the image processing section can be limited to a small-scale circuit. A necessity for preparing a plurality of types of gamma characteristics is obviated. Moreover, merging of images is performed within a short period of time, and hence the next shutter chance is prevented from slipping away.

The embodiment has described an example in which the image processing section 9 of the digital camera merges the high-sensitivity image signal and the low-sensitivity image signal and outputs resultant still image data. However, the present invention can also be applied to a case where the high-sensitivity image signal and the low-sensitivity image signal are stored in a recording medium as RAW data and where a composite image is produced by means of reading the RAW data through use of, e.g., a personal computer.

In this case, a user can arbitrarily select the value of the composite parameter "k" to be used for merging images. However, it is better to add to the RAW data, as tag information, the value of the composite parameter "k" determined to be optimum by the digital camera, so that the digital camera can make reference to the value of the composite parameter "k" determined to be optimum for a photographing scene of interest.

In the previously-described digital camera, the value of the composite parameter "k" is automatically determined by the exposure condition determination section 7. However, the function of enabling the user to manually perform designated input operation may be added to the digital camera. Thereby, the user can create a picture which meets the user's tastes.

Second Embodiment

Figure 7:
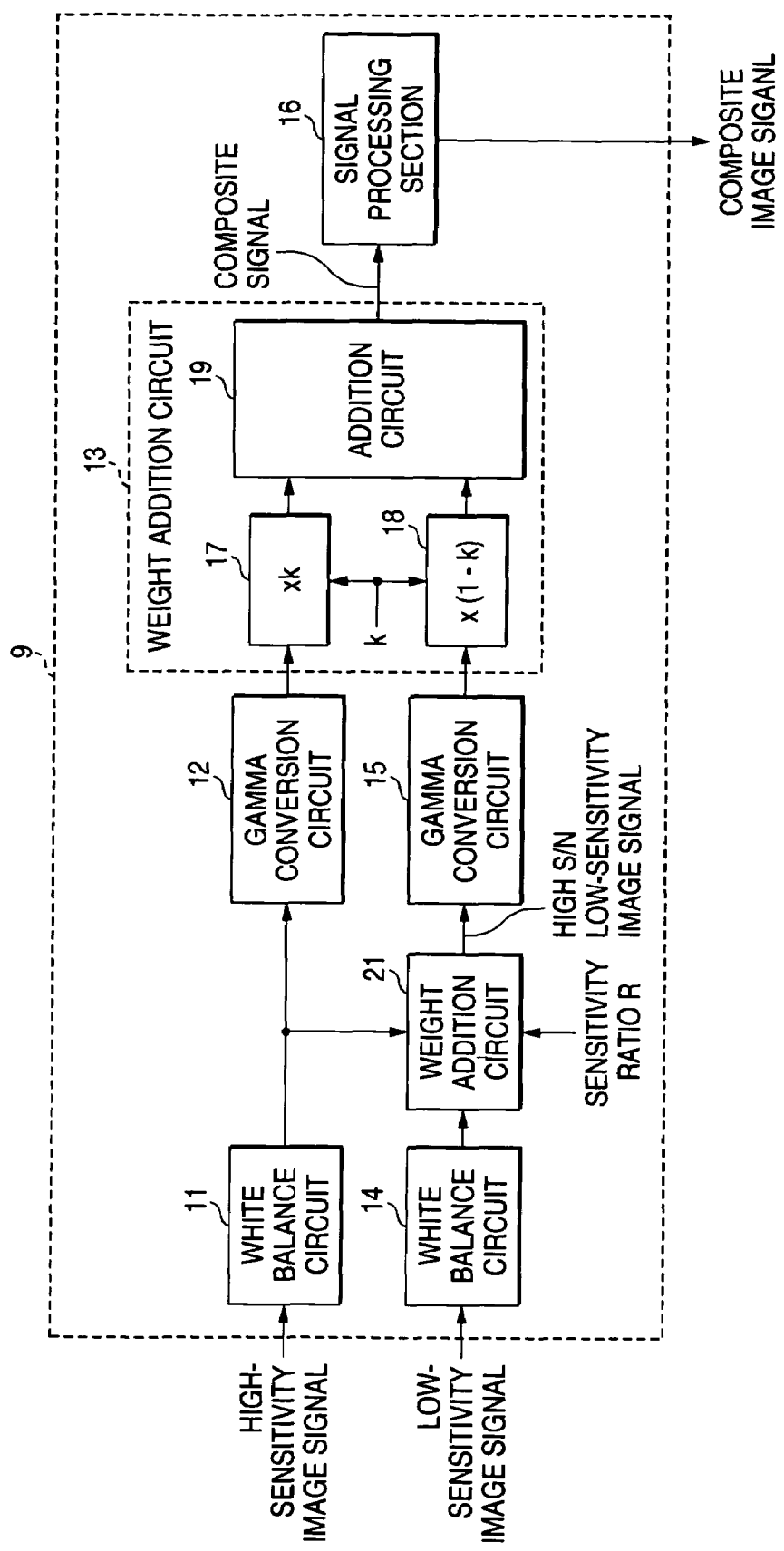
FIG. 7 is a detailed block diagram of an image processing section of a digital camera according to a second embodiment of the present invention.

FIG. 7 is a detailed block diagram of the image processing section 9 of the digital camera according to a second embodiment of the present invention. The entire digital camera is identical in configuration with the digital camera of the first embodiment shown in FIG. 1.

The present embodiment differs from the first embodiment in that a weight addition circuit 21 for enhancing a signal-to-noise ratio of the low-sensitivity image signal is inserted into a stage subsequent to the white balance circuit 14, which subjects the low-sensitivity image signal to white balance correction, and in that an output from the weight addition circuit is input to the gamma conversion circuit 15. In other respects, the present embodiment is identical with the first embodiment.

The weight addition circuit 21 receives inputs; that is, a high-sensitivity image signal output from the white balance circuit 11; a low-sensitivity image signal output from the white balance circuit 14; and the sensitivity ratio R.

In the first embodiment, a portion of the low-sensitivity image signal, the signal level of the portion being low, is used in its present form for merging images to form a composite signal. However, the low-level low-sensitivity image signal is inferior in terms of a signal-to-noise ratio and deteriorates the picture quality of a composite image. For this reason, in the present embodiment, the weight addition circuit 21 is added to the image processing section 9. Of the low-sensitivity image signal $S_L$ output from the white balance circuit 14, the low-sensitivity image signal $S_L$ having a low signal level is replaced with another signal $S'_L$ having a high signal-to-noise ratio. The signal $S'_L$ used for replacement is generated through use of a high-sensitivity image signal $S_H$ having a high signal-to-noise ratio output from the white balance circuit 11, as indicated by the following expression.

$$S'_L = S_L (S_H > S_{H2})$$

$$S'_L = S_H/R (S_H < S_{H1})$$

$$S'_L = \alpha \cdot S_L + (1-\alpha) \cdot S_H/R \text{ (in another case)}$$

where $S_{H1}$, $S_{H2}$ denote predetermined linear values of the high-sensitivity image signal satisfying [$S_{H1} < S_{H2} <$ linear saturation value of high-sensitivity image signal], where $\alpha = (S_H - S_{H1})/(S_{H2} - S_{H1})$.

As mentioned above, in the area of the signal level where the linear value of the high-sensitivity image signal $S_H$ is lower than the predetermined value $S_{H1}$, the low-sensitivity image signal—which is used for the merging expression and before undergoing gamma conversion—is replaced with a signal obtained by weighting average of the signal derived by division of the high-sensitivity image signal $S_H$ by the sensitivity ratio R, and the low-sensitivity image signal $S_L$, thereby enhancing the signal-to-noise ratio of the low-level portion of the composite image signal.

Third Embodiment

Figure 8:
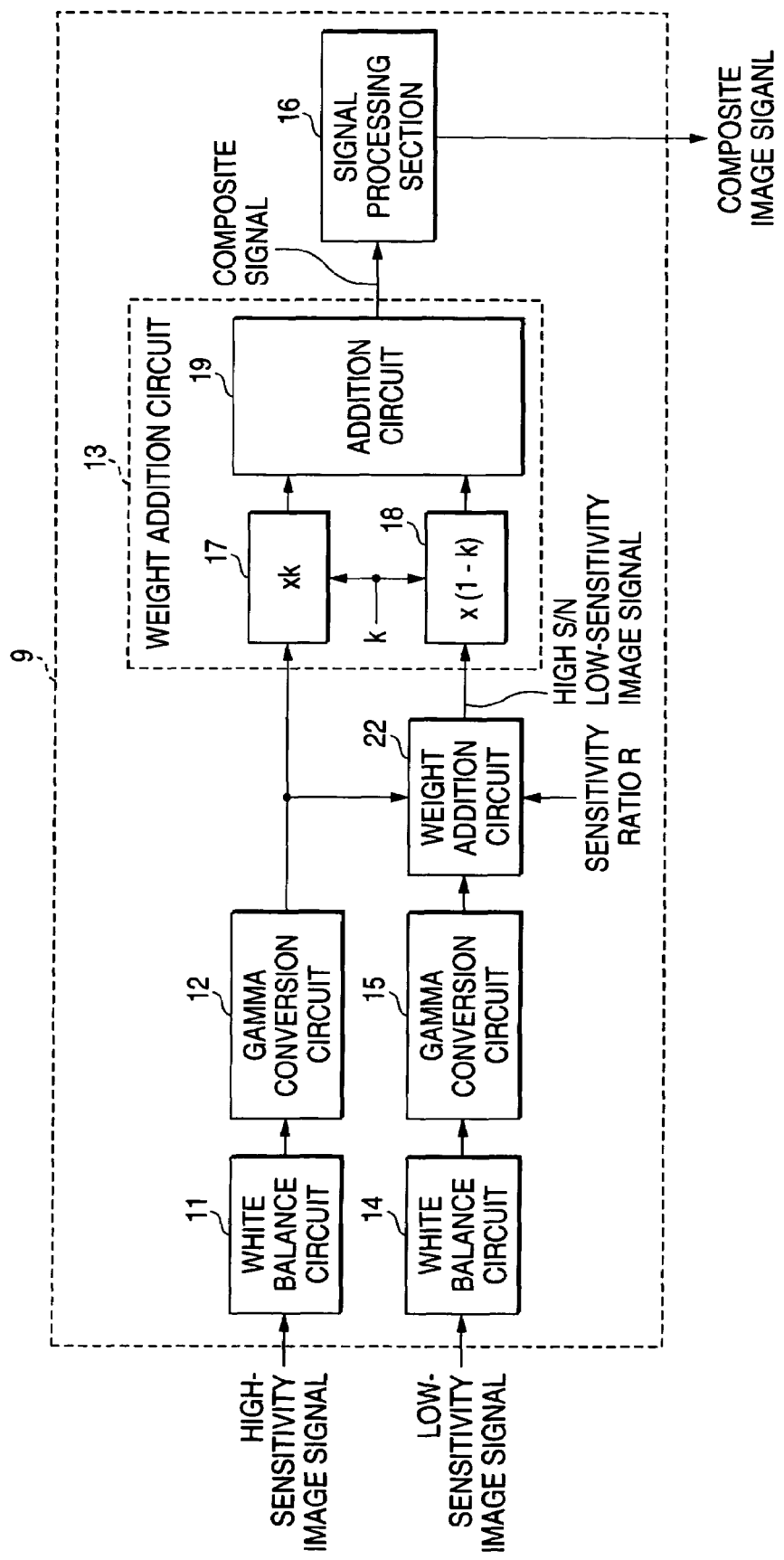
FIG. 8 is a detailed block diagram of an image processing section of a digital camera according to a third embodiment of the present invention.
Figure 9:
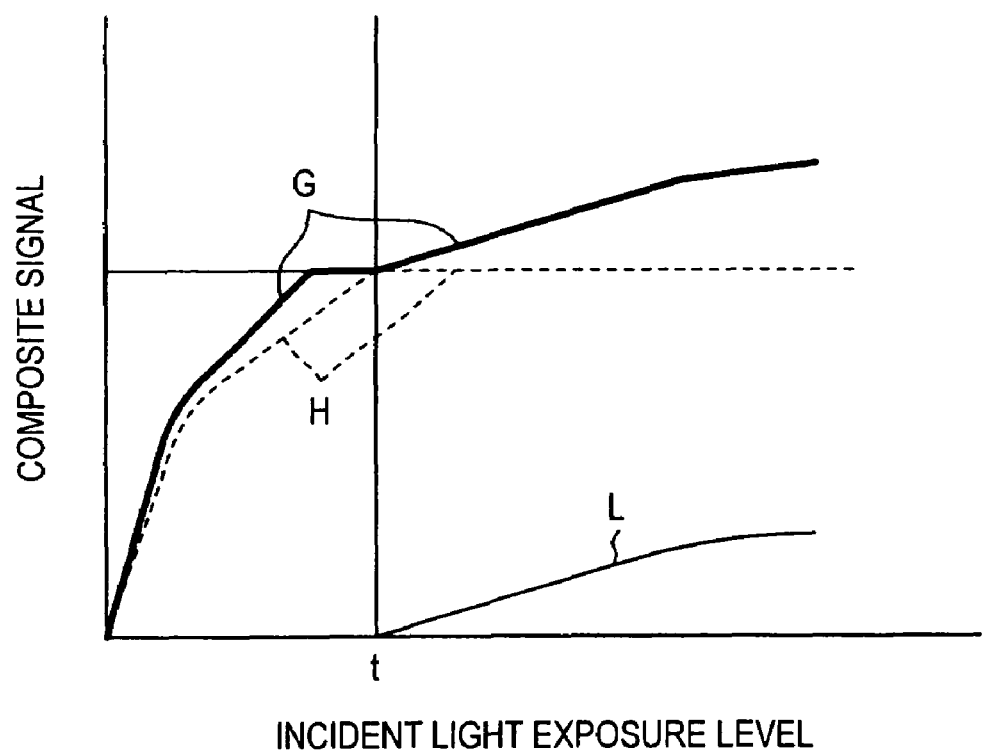
FIG. 9 is a descriptive view of drawbacks of a related-art technique.

FIG. 8 is a detailed block diagram of the image processing section 9 of the digital camera according to a third embodiment of the present invention. The entire digital camera of the third embodiment is identical in configuration with the digital camera of the first embodiment shown in FIG. 1 and that of the second embodiment.

The present embodiment differs from the second embodiment in that a weight addition circuit 22 is provided in a stage subsequent to the gamma conversion circuit 15, in contrast with the second embodiment in which the weight addition circuit 21 is disposed at the stage prior to the gamma conversion circuit 15. In other respects, the present embodiment is identical with the second embodiment.

In the second embodiment, the linear value of the low-sensitivity image signal is subjected to enhancement of the signal-to-noise ratio of the low-sensitivity image signal. In contrast, in the present embodiment the low-sensitivity image signal having undergone gamma conversion is subjected to enhancement of the signal-to-noise ratio of the low-sensitivity image signal. The weight addition circuit 22 receives inputs; that is, a high-sensitivity image signal $G_H(S_H)$ output from the gamma conversion circuit 12; a low-sensitivity image signal $G_L(S_L)$ output from the gamma conversion circuit 15; and the sensitivity ratio R. Subscripts $(S_H)$, $(S_L)$ of $G_H(S_H)$ and $G_L(S_L)$ are omitted, and only $G_H$, $G_L$ are used.

Specifically, in the present embodiment, a low-sensitivity image signal $G_L$ having a low signal level among the low-sensitivity image signals $G_L$ output from the gamma conversion circuit 15 is replaced with a low-sensitivity image signal $G'_L$ produced from the high-sensitivity image signal $G_H$ having a high signal-to-noise ratio. The signal $G'_L$ used for replacement is replaced, as indicated by the following expressions.

$$G'_L = G_L (G_H > G_{H2})$$

$$G'_L = G_H/R' (G_H < G_{H1})$$

$$G'_L = \beta \cdot G_L + (1-\beta) \cdot G_H/R' \text{ (in another case)}$$

where $G_{H1}$, $G_{H2}$ denote predetermined linear values of the high-sensitivity image signal satisfying [$G_{H1} < G_{H2} <$ saturation value of high-sensitivity image signal obtained after gamma conversion], where $\beta = (G_H - G_{H1})/(G_{H2} - G_{H1})$. Further, R' is a sensitivity ratio to be used for converting the high-sensitivity image signal into the low-sensitivity image signal and is obtained after the sensitivity ratio R has been subjected to gamma conversion. The sensitivity ratio R' is a constant value falling within the range of $1 \leq R' \leq R$.

As mentioned above, in the area of the signal level where the value of the high-sensitivity image signal $G_H$ is lower than the predetermined value $G_{H1}$, the low-sensitivity image signal $G_L$—which is used for the merging expression and before undergoing gamma conversion—is replaced with a signal obtained by weighting average of the signal derived by division of the high-sensitivity image signal $G_H$ by the sensitivity ratio R', and the low-sensitivity image signal $G_L$, thereby enhancing the signal-to-noise ratio of the low-level portion of the composite image signal.

The above-described embodiments have been described while a digital camera photographing color images is taken as an example. As a matter of course, the present invention can also be applied to a digital camera photographing black-and-white images. Further, the embodiments have described that the gamma characteristic to be used for subjecting the high-sensitivity image signal to gamma conversion is different from a gamma characteristic to be used for subjecting the low-sensitivity image signal to gamma conversion. However, the present invention can also be put into practice by rendering these gamma characteristics identical with each other. In this case, the capacity of the memory required to store the table of gamma characteristics is curtailed.

In the second and third embodiments, the weight addition circuits 21, 22 are incorporated in the digital camera. However, needless to say, a personal computer can subject RAW data pertaining to the high-sensitivity image signal and the low-sensitivity image signal to the signal processing to be performed by these weight addition circuits.

According to the invention, a junction between the high-sensitivity image signal and the low-sensitivity image signal becomes smooth over the entire range of incident light exposure level, and hence an image of a subject having a wide dynamic range becomes natural.

According to the present invention, an unnatural image portion does not rise when an image of a subject having a wide dynamic range is generated by means of merging a high-sensitivity image signal and a low-image sensitivity image signal. Hence, the present invention can be utilized as a digital camera, an image composition method, and a solid-state imaging device.

The entire disclosure of each and every foreign patent application from which the benefit of foreign priority has been claimed in the present application is incorporated herein by reference, as if fully set forth.

What is claimed is:

1. An image composition method comprising:
subjecting a first high-sensitivity image signal generated based on high-sensitivity image outputs from corresponding ones of a plurality of pixel positions in a solid-state imaging element that has imaged a subject, to a first nonlinear conversion, so as to prepare a second high-sensitivity image signal;
subjecting a first low-sensitivity image signal generated based on low-sensitivity image outputs from corresponding ones of the plurality of pixel positions, to a second nonlinear conversion, so as to prepare a second low-sensitivity image signal;

subjecting the second high-sensitivity image signal and the second low-sensitivity image signal to weight adding at every common pixel position, over the entire range of an incident light exposure level exhibited by each incident light that entered to each of the plurality of pixel positions, so as to produce a composed image signal of the subject; and replacing at least one of the first low-sensitivity image signal and the second low-sensitivity image signal with a third signal in a signal level range in which a linear value of the first high-sensitivity image signal is lower than a predetermined level, wherein the third signal is obtained by subjecting to weighting average a fourth signal and the first low-sensitivity image signal, the fourth signal being provided as [the first high-sensitivity image signal/a sensitivity ratio], wherein the sensitivity ratio=[the first high-sensitivity image signal/the first low-sensitivity image signal at a predetermined exposure time];

wherein, provided that the second high-sensitivity image signal is taken as $G_H(S_H)$; the second low-sensitivity image signal is taken as $G_L(S_L)$; and the composed image signal is taken as Gc, the weight adding is performed according to a composing expression:

$$Gc = k \cdot G_H(S_H) + (1-k) \cdot G_L(S_L)$$

where k is a composite parameter having a value falling within a range of $0 \leq k \leq 1$.

2. The image composition method according to claim 1, wherein a high-sensitivity image output and a low-sensitivity image output are image outputs from a high-sensitivity pixel and a low-sensitivity pixel in a common pixel position, respectively.

3. The image composition method according to claim 1, wherein a high-sensitivity image output is an image output by a longer period of exposure, and a low-sensitivity image output is an image output by a shorter period of exposure, by using a common pixel.

4. The image composition method according to claim 1, wherein k is determined by a histogram shape of the first high-sensitivity image signal and a histogram shape of the first low-sensitivity image signal.

5. The image composition method according to claim 1, wherein k is determined by a sensitivity ratio of the first high-sensitivity image signal to the first low-sensitivity image signal at a predetermined exposure time.

6. The image composition method according to claim 1, wherein k is determined by:

(a) a histogram shape of the first high-sensitivity image signal and a histogram shape of the first low-sensitivity image signal; and (b) a sensitivity ratio of the first high-sensitivity image signal to the first low-sensitivity image signal at a predetermined exposure time.

7. The image composition method according to claim 1, wherein the first nonlinear conversion is a first gamma conversion which realizes a monotonously-increasing function and of which a slope is positive or zero at all times and monotonously decreasing;

the second nonlinear conversion is a second gamma conversion which realizes a monotonously-increasing function and of which a slope is positive or zero at all times and monotonously decreasing; and a characteristic of the first gamma conversion differs from a characteristic of the second gamma conversion.

8. A solid-state imaging device comprising:

a solid-state imaging element having a plurality of pixel positions, wherein the solid-state imaging element images a subject, and generates high-sensitivity image outputs from corresponding ones of the plurality of pixel positions and low-sensitivity image outputs from corresponding ones of the plurality of pixel positions; and an image processing portion that subjects a first high-sensitivity image signal generated based on the high-sensitivity image outputs, to a first nonlinear conversion, so as to prepare a second high-sensitivity image signal, subjects a first low-sensitivity image signal generated based on the low-sensitivity image outputs, to a second nonlinear conversion, so as to prepare a second low-sensitivity image signal, subjects the second high-sensitivity image signal and the second low-sensitivity image signal to weight adding at every common pixel position, over the entire range of an incident light exposure level exhibited by each incident light that entered to each of the plurality of pixel positions, so as to produce a composed image signal of the subject, replaces at least one of the first low-sensitivity image signal and the second low-sensitivity image signal with a third signal in a signal level range in which a linear value of the first high-sensitivity image signal is lower than a predetermined level, wherein the third signal is obtained by subjecting to weighting average a fourth signal and the first low-sensitivity image signal, the fourth signal being provided as [the first high-sensitivity image signal/a sensitivity ratio], wherein the sensitivity ratio=[the first high-sensitivity image signal/the first low-sensitivity image signal at a predetermined exposure time]; and outputs the composed image signal;

wherein, provided that the second high-sensitivity image signal is taken as $G_H(S_H)$; the second low-sensitivity image signal is taken as $G_L(S_L)$; and the composed image signal is taken as Gc, the weight adding is performed according to a composing expression:

$$Gc = k \cdot G_H(S_H) + (1-k) \cdot G_L(S_L)$$

where k is a composite parameter having a value falling within a range of $0 \leq k \leq 1$.

9. A digital camera comprising:

a solid-state imaging device according to claim 8; and an optical system that forms an optical image of the subject on the solid-state imaging element.

10. A solid-state imaging device comprising:

means for subjecting a first high-sensitivity image signal generated based on high-sensitivity image outputs from corresponding ones of a plurality of pixel positions in a solid-state imaging element that has imaged a subject, to a first nonlinear conversion, so as to prepare a second high-sensitivity image signal;

means for subjecting a first low-sensitivity image signal generated based on low-sensitivity image outputs from corresponding ones of the plurality of pixel positions, to a second nonlinear conversion, so as to prepare a second low-sensitivity image signal;

means for subjecting the second high-sensitivity image signal and the second low-sensitivity image signal to weight adding, over the entire range of an incident light exposure level exhibited by each incident light that entered to each of the plurality of pixels, so as to produce a composed image signal of the subject; and means for replacing at least one of the first low-sensitivity image signal and the second low-sensitivity image signal with a third signal in a signal level range in which a linear value of the first high-sensitivity image signal is lower than a predetermined level, wherein the third signal is obtained by subjecting to weighting average a fourth signal and the first low-sensitivity image signal, the fourth signal being provided as [the first high-sensitivity image signal/a sensitivity ratio], wherein the sensitivity ratio=[the first high-sensitivity image signal/the first low-sensitivity image signal at a predetermined exposure time];

wherein, provided that the second high-sensitivity image signal is taken as $G_H(S_H)$; the second low-sensitivity image signal is taken as $G_L(S_L)$; and the composed image signal is taken as Gc, the weight adding is performed according to a composing expression:

$$Gc = k \cdot G_H(S_H) + (1-k) \cdot G_L(S_L)$$

where k is a composite parameter having a value falling within a range of $0 \leq k \leq 1$.

11. An image composition method comprising:

subjecting a first high-sensitivity image signal generated based on high-sensitivity image outputs from corresponding ones of a plurality of pixel positions in a solid-state imaging element that has imaged a subject, to a first nonlinear conversion, so as to prepare a second high-sensitivity image signal;

subjecting a first low-sensitivity image signal generated based on low-sensitivity image outputs from corresponding ones of the plurality of pixel positions, to a second nonlinear conversion, so as to prepare a second low-sensitivity image signal; and subjecting the second high-sensitivity image signal and the second low-sensitivity image signal to weight adding at every common pixel position, over the entire range of an incident light exposure level exhibited by each incident light that entered to each of the plurality of pixel positions, so as to produce a composed image signal of the subject;

wherein the first nonlinear conversion is a first gamma conversion which realizes a monotonously-increasing function and of which a slope is positive or zero at all times and monotonously decreasing;

the second nonlinear conversion is a second gamma conversion which realizes a monotonously-increasing function and of which a slope is positive or zero at all times and monotonously decreasing; and a characteristic of the first gamma conversion differs from a characteristic of the second gamma conversion;

replacing at least one of the first low-sensitivity image signal and the second low-sensitivity image signal with a third signal in a signal level range in which a linear value of the first high-sensitivity image signal is lower than a predetermined level, wherein the third signal is obtained by subjecting to weighting average a fourth signal and the first low-sensitivity image signal, the fourth signal being provided as [the first high-sensitivity image signal/a sensitivity ratio], wherein the sensitivity ratio=[the first high-sensitivity image signal/the first low-sensitivity image signal at a predetermined exposure time]; and wherein, provided that the second high-sensitivity image signal is taken as $G_H(S_H)$; the second low-sensitivity image signal is taken as $G_L(S_L)$; and the composed image signal is taken as Gc, the weight adding is performed according to a composing expression:

$$Gc = k \cdot G_H(S_H) + (1-k) \cdot G_L(S_L)$$

where k is a composite parameter having a value falling within a range of $0 \leq k \leq 1$.

* * * * *